United States Patent
Koeman

(10) Patent No.: US 6,973,512 B1
(45) Date of Patent: Dec. 6, 2005

(54) ADAPTIVE PERIPHERAL DEVICE DRIVER AND SOFTWARE CALL METHODOLOGY FOR CREATING SAME

(75) Inventor: Constantyn Koeman, Bothell, WA (US)

(73) Assignee: Cypress Semiconductor Corp., San Jose, CA (US)

(*) Notice: Subject to any disclaimer, the term of this patent is extended or adjusted under 35 U.S.C. 154(b) by 480 days.

(21) Appl. No.: 09/947,722

(22) Filed: Sep. 6, 2001

(51) Int. Cl.⁷ .......................... G06F 3/00; G06F 13/00
(52) U.S. Cl. .............................. 710/38; 710/8; 710/10; 710/36; 710/62
(58) Field of Search ................................ 710/10, 72, 8, 710/62–64, 73, 74, 36, 38, 5, 3, 2, 9; 709/521, 709/250

(56) References Cited

U.S. PATENT DOCUMENTS

| | | | | |
|---|---|---|---|---|
| 6,061,746 A | * | 5/2000 | Stanley et al. | 710/10 |
| 6,205,503 B1 | * | 3/2001 | Mahalingam | 710/72 |
| 6,470,397 B1 | * | 10/2002 | Shah et al. | 709/250 |
| 6,484,226 B1 | * | 11/2002 | Wallach et al. | 710/10 |
| 2002/0178300 A1 | * | 11/2002 | Dubal et al. | 709/321 |

* cited by examiner

Primary Examiner—Kim Huynh
Assistant Examiner—Joshua D Schneider
(74) Attorney, Agent, or Firm—Kevin L. Daffer; Daffer McDaniel, LLP

(57) ABSTRACT

An adaptive driver and method is presented for communicating between an operating system of a computer and various peripheral devices connected to the computer via a peripheral bus. Operating characteristics and input/output characteristics of the peripheral device and all intervening hardware devices placed between the operating system and the peripheral device are noted in a linked set of data fields, i.e., a driver stack. Serialized data transfers are coordinated using the driver stack, and each request for a data transfer is submitted to the stack in the form of an input/output request packet (IRP). Unlike conventional practice, in which IRPs must be pre-defined and hard-coded to conform to the characteristics of a particular peripheral device, the adaptive driver derives the device characteristics from data structures maintained by the operating system and constructs IRPs accordingly. Thus, a driver embodying the method presented herein is capable of supporting a variety of dissimilar USB peripherals, requiring substantially no modification of the driver software.

21 Claims, 10 Drawing Sheets

ADAPTIVE PERIPHERAL DEVICE DRIVER AND SOFTWARE CALL METHODOLOGY FOR CREATING SAME

BACKGROUND OF THE INVENTION

1. Field of the Invention

This invention relates to a computer peripheral, and more particularly to a driver for operating the peripheral. The driver is adaptable and compiled from programmable, user selectable computer software call routines to implement the driver function of interfacing the computer to the peripheral linked via a serial bus. The driver can adapt to characteristics of differing types of peripheral linked to the serial bus.

2. Description of the Related Art

Until recently, each peripheral (hereinafter "peripheral device" or "device") linked to a computer via a peripheral bus required its own input/output port. This requirement restricted the number of devices that could be interfaced to the computer. For example, a typical computer might be equipped with a single parallel port. With a printer attached to the sole parallel port, the computer was not capable of supporting any additional printers.

The need for a dedicated port for each peripheral device also complicated the process of adding or interchanging peripheral devices. Each peripheral device linked to a peripheral bus required its own unique identification number, often referred to as its interrupt request (IRQ) setting. When a peripheral device makes a request to the operating system for a data transfer, the IRQ number is typically used to identify the peripheral device making the request. For example, an internal modem that plugs into a slot in the main board of the computer has its own unique IRQ number. Conflicts may arise when a new device is added that attempts to use the same IRQ number as a previously installed device.

Plug-and-play ("PnP") capability is a feature of many current operating systems, such as Windows 98®. PnP allows the user to plug a device into a computer and have the operating system of the computer to which the peripheral device is connected recognize that the device has been connected. The operating system automatically allocates input/output resources, including an IRQ number, to the newly connected device. The advent of PnP helped overcome many of the problems arising from IRQ number conflicts, but a limitation on the number of peripheral devices that could be supported by the computer remained.

Further efforts to overcome the limitation on the number of peripheral devices that can be connected to a computer and the inherent conflict in request numbers attributed to each peripheral had significant practical disadvantages. For example, expansion cards, which effectively multiply the available ports on the computer, made it possible to increase the number of peripheral devices that could be attached to a computer. However, reliance on a separate cable to connect each peripheral device to the expansion card limited the number of peripheral devices that could be accommodated.

In the mid to latter 1990s, the concept of using a high-speed serial bus gained popularity. Data communications typically involves the transfer of data words consisting of multiple binary digits, or bits. For example, a word may be comprised of 8 bits, where each bit has a value of either logic 0 or logic 1. With a serial bus, data words are transferred one bit at a time over a single communication path, such as a wire, fiber, etc. In contrast, with a parallel bus, several (possibly all) of the bits in each data word are transferred simultaneously, using multiple communication paths. Theoretically, a parallel bus may seem intrinsically faster than a serial bus, since the serial bus must sequentially send out the bits of each data word. However, some serial communications media (e.g., optical fiber) allow very high signal rates, overcoming this theoretical disadvantage. For example, dual wires may be employed to transmit a single channel of serial data as a differential signal, thereby enhancing speed and noise immunity. Furthermore, a parallel bus suffers from the disadvantage that it must provide a separate signal path for each bit of the data words being transferred, whereas a serial bus requires only one signal path regardless of the size of the data words. This generally adds to the cost and complexity of a parallel bus, making it less attractive than a serial bus.

A popular form of serial data exchange arose with the advent of the Universal Serial Bus (USB). USB eliminates the need for a dedicated port for each peripheral device, allowing several devices to be connected to one USB port. USB can be implemented with PnP features, so that the operating system of the computer, to which the USB is connected, can automatically detect a USB device connected to the USB. Each device has a set of descriptors—including device, configuration, interface, and endpoint descriptors. The descriptors define the input/output characteristics of the device, and are used by the operating system to allocate resources to that USB device. For example, if the peripheral device is a USB-compliant audio tape player, the descriptors would inform the operating system that data will typically be received in a continuous stream, thus allowing the operating system to allocate a suitable memory buffer in which to receive the data. The information contained in the descriptors is provided by a PnP device after being queried by the operating system when the device is a first installed. Consequently, USB-compliant peripherals can be interfaced to a computer without having to install interface cards or reconfigure IRQ settings. In fact, new USB devices can be installed or removed without even shutting the computer off.

USB provides higher performance than the traditional parallel and serial ports provided on personal computers. The original USB version 1.0 standard introduced two data transfer signaling rates, 12 MHz (full-speed) and 1.5 MHz (low-speed). Full-speed data transfer rates far surpass the speed of conventional UART-based serial ports. Thus, a single USB port has sufficient bandwidth to support several peripheral devices. Moreover, the USB version 2.0 standard, more recently released, introduced another signaling rate, 480 MHz (high-speed), that provides enough bandwidth to support high-bandwidth applications such as high-quality video and external disk drives.

A typical USB cable requires four conductors: power, ground and a pair of signal wires. Peripheral devices with limited power demands (e.g., a mouse) can derive power directly from the USB bus. There are generally two types of devices in a USB network—i.e., a host/hub device or a device remote from the host/hub device. The host is the manager of the USB network, typically a computer. A "hub" is a device that distributes the serialized data and control signals to other USB peripherals. Accordingly, each end of a USB cable has different connectors. At one end of the cable is a host/hub connector, while at the other is a peripheral connector. Thus, a device remote from the host/hub (i.e., USB peripheral) has both a peripheral input and a host/hub output, allowing the USB peripheral to be "daisy-chained" with other USB peripherals.

The physical arrangement of USB peripheral devices is described as a "tiered star" topology, as illustrated in FIG. 1. A computer, or Personal Computer (PC) 10 is shown in FIG. 1, equipped with two USB host ports 12a and 12b. The first USB host port 12a is connected to a USB peripheral port 18 on a monitor/hub 16. Monitor/hub 16 is shown as a compound device (i.e., a peripheral device that also functions as a hub), and has three host/hub outputs 20a–c. Each of the host/hub outputs is connected to the peripheral input on a USB peripheral device (inputs 30, 34, and 38 on devices 28, 32, and 36, respectively).

The second USB host port 12b is connected to the peripheral port 24 on a standalone device 22. (In contrast to a compound device, a standalone device serves only as a hub and not as a peripheral device.) Each host/hub port 26a and 26b on the standalone hub connects to the peripheral input on a USB peripheral device (inputs 42 and 46 on devices 40 and 44, respectively). A third host/hub port 26c on standalone hub 22 is unused.

This example illustrates the capability of USB to support numerous peripheral devices. Six peripheral devices (monitor 16, phone 28, modem 32, mouse 36, keyboard 40 and video camera 44) are connected to a PC equipped with only two USB ports 12a and 12b. Note that if PC 10 had only one USB port, it would still be possible to support these six peripheral devices. For example, by connecting peripheral port 24 to port 20c and connecting peripheral port 38 to port 26c, all six peripheral devices could be supported by host port 12a alone.

The tiered structure of the USB network in FIG. 1 is indicated by the pairs of dashed lines. The host is always at the first tier in a USB network. Hubs that are directly connected to the host comprise the second tier, followed by peripherals and/or other hubs at successive tiers. In this case, the host at the first tier is PC 10. Monitor/hub 16 and standalone hub 22 occupy the second tier, and the various USB peripherals 28, 32, 36, 40, and 44 occupy the third tier.

The data flow model for USB does not resemble the tiered physical configuration of the peripheral devices represented in FIG. 1. Instead, each USB device is represented by one or more "endpoints." An endpoint is a source or recipient of data, and is connected by an independent data path (referred to as a "pipe") to the host. Each endpoint has a unique address assigned by the device. The data flow model is illustrated in FIG. 2. On the bus, endpoints are addressed by the device address (assigned by the operating systems) and an endpoint address (assigned by the device). The device address designates a particular USB peripheral device, which, depending on its complexity, may have multiple endpoint addresses. For example, a combination FAX/printer/copier may constitute a single USB device, with each of its multiple functions corresponding to a distinct USB endpoint.

In FIG. 2, the host or computer 50 runs client software that transfers data over the USB bus. For example, a multimedia application, such as a video game may transfer data to and from three USB peripheral devices, represented in FIG. 2 as endpoints 56a–c. Note that a single peripheral device may appear as multiple endpoints, corresponding to independent functions. For example, a digital scanner may employ one pipe to interface to the scanner controls and another to transfer image data. Associated with each endpoint is a data buffer 52a–c in the host, and a data pipe 54a–c through which the data is transmitted in serial format to respective endpoints on corresponding pipes. This model suggests that data flows directly to each endpoint through its respective pipe. On the contrary, as shown in the physical model of FIG. 1, all endpoints attached to a given USB host port share a common data path. This fact is hidden from the client software developer by an input/output manager within the operating system, that manages the data flow between each host buffer 52a–c and its respective USB endpoint 56a–c. There is a direct one-to-one correspondence between pipes and endpoints in the USB data flow model.

USB is a host-based communication environment. This means that the host initiates all transactions, i.e., USB peripheral devices can respond to, but not initiate bus transfers. The driver within the host corresponding to a peripheral device may request the host controller to transfer data to/from an endpoint on the peripheral device. The host controller driver instructs the host controller hardware to send data to the endpoint of the peripheral device, or to request the peripheral's endpoint to send data to the host controller. These data transfers are in the form of variable-length packets. The packet transfers are scheduled by the host, to permit time-multiplexed access to the USB bus by the other peripheral devices. The host controller broadcasts transactions over the entire bus. Hubs must repeat the transfers to devices connected to their downstream ports. When a device responds to the host, the hubs will repeat the response on its upstream port that eventually reaches the host. Since USB transactions are directed to a specific endpoint address, only a single device responds to a transaction.

An application program is quite often written in high-level code, in which each instruction is equivalent to several elementary operations. Most hardware devices do not directly respond to high-level commands, but require very specific instruction sequences to enable them to perform a given function. For example, suppose an application programmer is developing a program to store medical records onto a backup tape. Among the things he will be concerned with are accessing the database, formatting the data for storage, etc. From the perspective of the application programmer, the actual transfer of the data to tape will represent a relatively minor step in this process. Conveniently, the operating system provides a system call to write a data record to tape. However, from a hardware perspective, writing a data record is a complex procedure, in which the tape drive must coordinate the operation of its drive motor, tape head, position sensor, etc. A detailed command sequence must therefore be issued to the tape drive to enable it to correctly perform these operations. Such a command sequence employs low-level code, and demands considerable familiarity with the hardware on the part of the programmer. Acquiring the device-specific knowledge needed to prepare low-level code is typically beyond the objectives of the application programmer. If a device driver is available for the particular hardware device (in this case, the tape drive), the application programmer is spared the trouble of developing the necessary low-level code.

A device driver is a software interface between an application program or the operating system and a particular hardware device. FIG. 3 illustrates how device drivers are used to interface peripheral devices to an application program. An application 60 is developed to run on two different computer systems 74 and 76. Both systems are equipped to operate a tape drive 68. However, the first system can also operate an inkjet printer 66, while the second system operates a laser printer 72. Associated with each peripheral device is a device driver, i.e., there is a driver 62 for the inkjet printer 66, a driver 64 for the tape drive 68, and a driver 70 for the laser printer 72. Since the same tape drive 68 is used for both systems, the same driver 64 is used. In each system, application 60 prints a report when it has completed transferring data to the tape drive 68. The application programmer would like to use the same high-level code to generate the report, regardless of which printer is used to print it. However, the specific instructions that must be issued to cause inkjet printer 66 to print the report will generally differ from the corresponding instructions for the laser printer 72. Furthermore, the application may be required to run on other computer systems, equipped with various other types of printers. It would not be feasible for the application programmer to include the specific low-level code for every anticipated type of printer within the application itself. Instead, the application program issues generic high-level instructions to the appropriate driver for the attached printer. The driver, in effect, translates these high-level instructions into the necessary hardware-specific low-level commands to print the report.

Thus, the use of hardware drivers allows the application programmer to avoid low-level programming of the respective hardware device. Device-specific drivers may be linked with the application program before execution, or called by the application from a dynamic library during runtime. In addition to the role described above, USB drivers have other characteristics related to the tiered star USB bus configuration, as described in detail below.

Creating and testing a software driver for a USB device can be laborious and error-prone. Furthermore, a new driver must be developed to support each different USB device that is introduced. As a result, driver development may be costly in terms of time and effort. Consequently, it would be desirable to have an adaptive driver, which ascertains the relevant characteristics of a given peripheral device and automatically conforms to its input/output requirements. The use of such a driver would simplify driver development tremendously, reduce cost and development time, and eliminate a major source of software errors. It would be of further advantage if the method used to create the adaptive driver and to configure it to various peripheral devices be applicable to any peripheral device attachable to a serial bus.

SUMMARY OF THE INVENTION

The problems outlined above may be addressed by a method for an adaptive driver that can be programmed to drive the hardware of a peripheral device connectable to a serial link. The adaptable driver beneficially acquires the specific characteristics of the peripheral device from data structures created by the operating system when the peripheral device is first installed. Using the device-related information found in these data structures, the adaptive driver builds an appropriate input/output request packet (IRP) with which to submit requests to the operating system for serialized data transfers to or from the peripheral. Thus, various dissimilar peripheral devices can be supported with no modification to the adaptive driver. This capability avoids the need for the programmer to develop special driver software for each peripheral device. The adaptive driver also lessens development time and effort.

A driver is a software module that serves as an interface between a peripheral device and a calling program (i.e., a program that wants to communicate with the peripheral device). A method is disclosed herein to compile an adaptive software driver for a peripheral device. Preferably, the peripheral device is one that is connected to a serial bus for communicating serialized data between the peripheral device and the computer/host. The method includes locating a USBD_PIPE_INFORMATION data structure that was created by the operating system when the peripheral device was installed. This data structure defines the input/out parameters of the peripheral device. Using these input/output parameters, the adaptive driver creates an IRP appropriate for the peripheral device. The driver then requests the computer to transfer data to/from the peripheral device over the USB bus by submitting the IRP to a driver stack maintained by the operating system. When the transfer has been completed, the operating system sends the IRP (with an indication of its completion status) back down the stack to the driver.

To create a fully functional driver, a user-supplied completion routine must be combined with the adaptive portion of the driver stack software code. When the IRP is received from the driver stack following a data transfer, the completion routine is called to notify the calling program of the completion status.

The embodiments of the driver, driver stack, and method of forming the driver and driver stack apply to the Windows® operating system. However, the driver and methodology is also applicable to other operating systems. Similarly, the driver and driver formation methodology is believed to be suitable for use not only with a USB, but also with other buses, such as IEEE1394 ("Firewire"), Bluetooth, and other buses that have different transfer types. While USB is described and shown in the specification and drawings that follow, it is understood that the present invention is applicable to other transfer protocols, provided the transfer is serialized or sent as a packet across a conductor.

BRIEF DESCRIPTION OF THE DRAWINGS

Other objects and advantages of the invention will become apparent upon reading the following detailed description and upon reference to the accompanying drawings in which.

Figure 1:
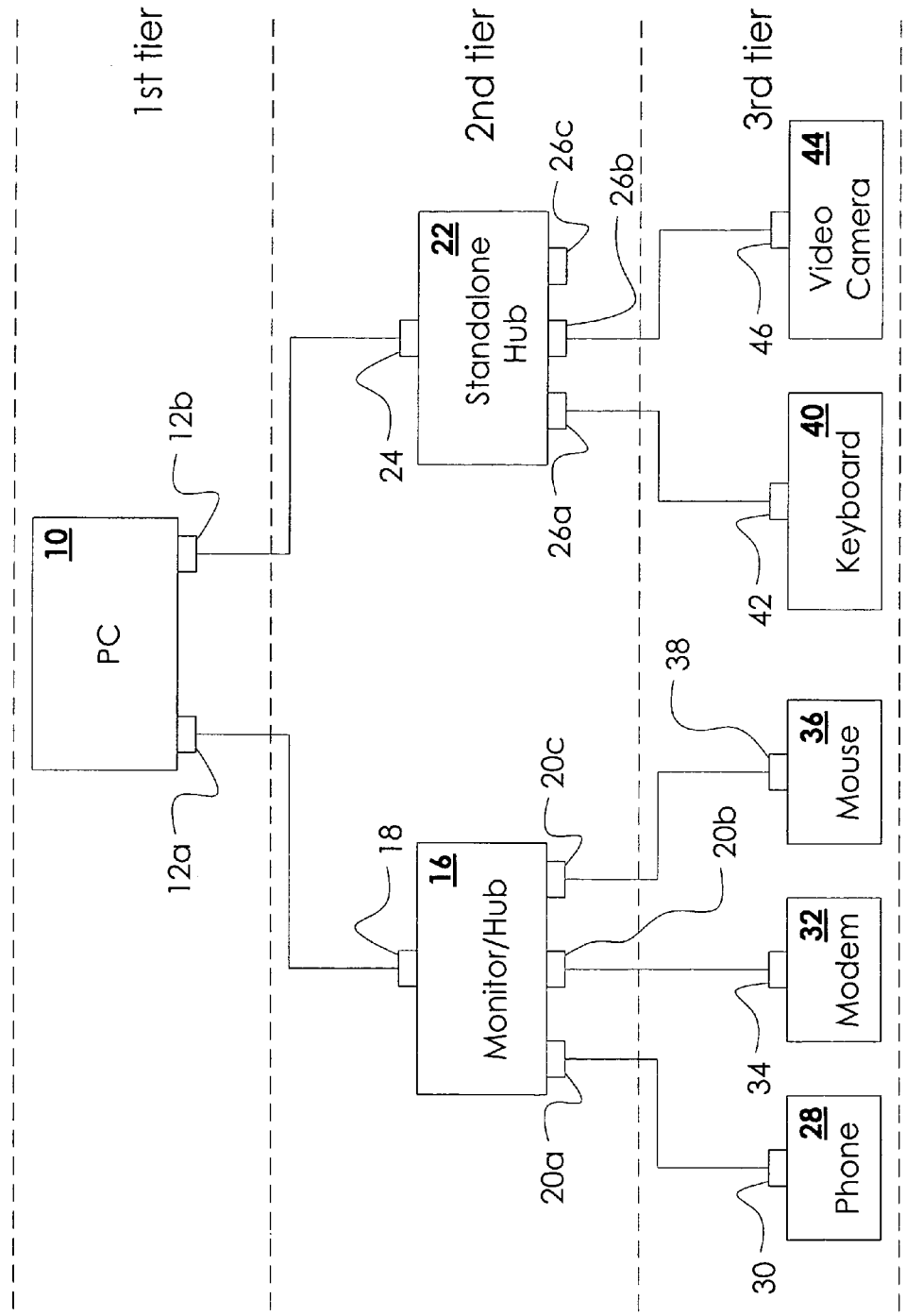
FIG. 1 illustrates the physical relationship between components attached to a USB bus.
Figure 2:
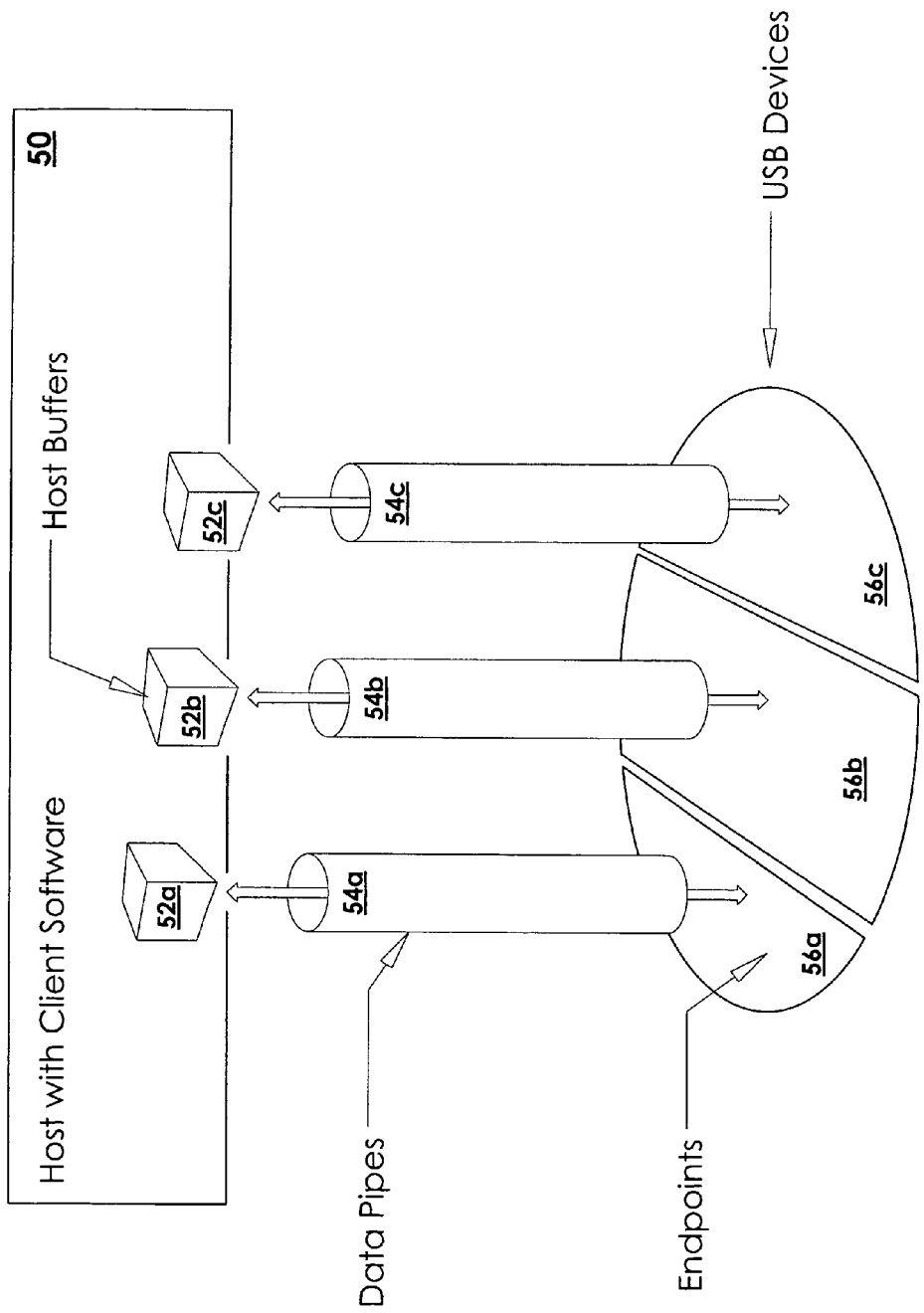
FIG. 2 represents the USB data flow model, depicting the use of data "pipes" connecting the host and the USB endpoints.
Figure 3:
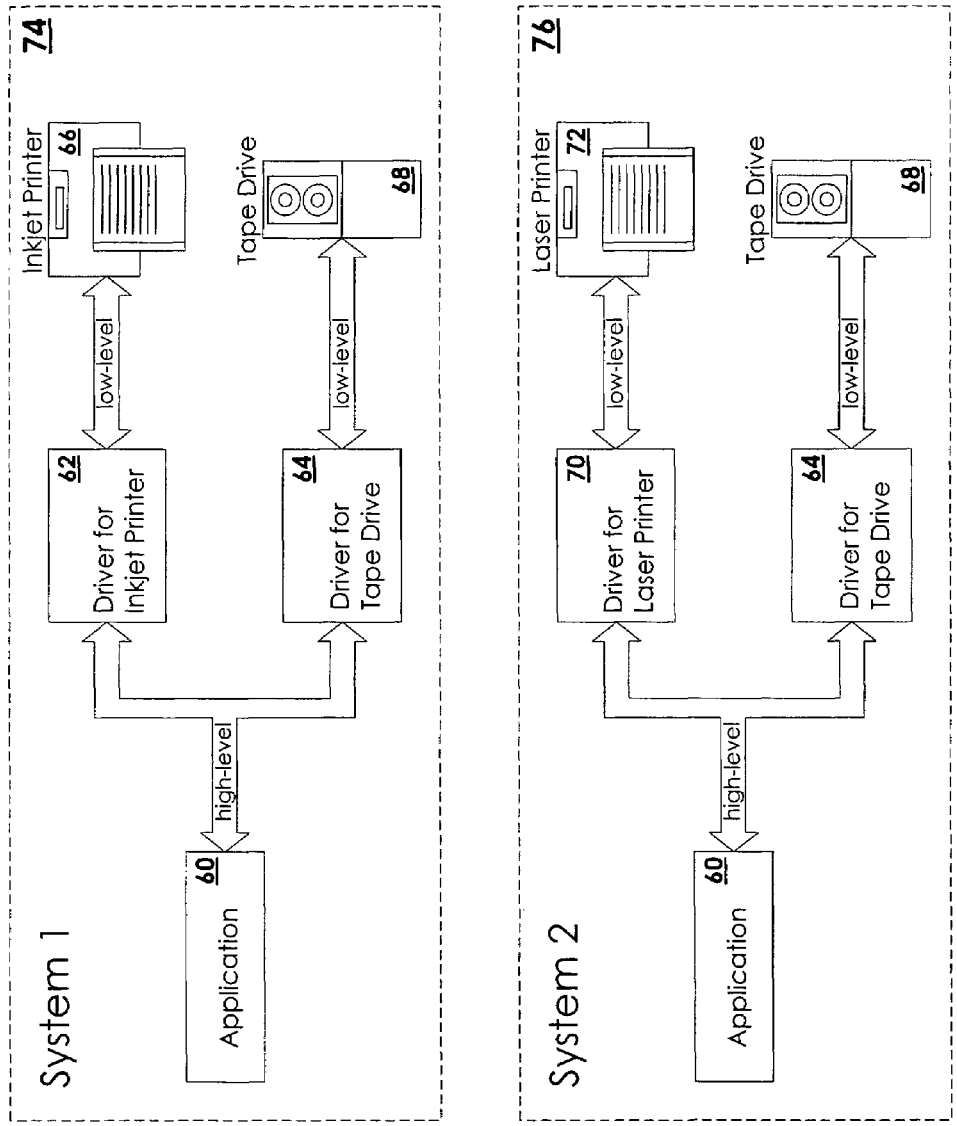
FIG. 3 illustrates the use of drivers to interface high-level application programs to peripheral devices.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

As noted above, considerable time and expense may be expended in the development of drivers for peripheral devices. An adaptive driver would be beneficial in greatly reducing driver development time, while improving the reliability of driver software. The present adaptive driver software is capable of determining characteristics of the peripheral device it is intended to support, and to use this information to construct the appropriate data structures used by the USB driver stack for host-to-peripheral and/or peripheral-to-host communications.

Figure 4A:
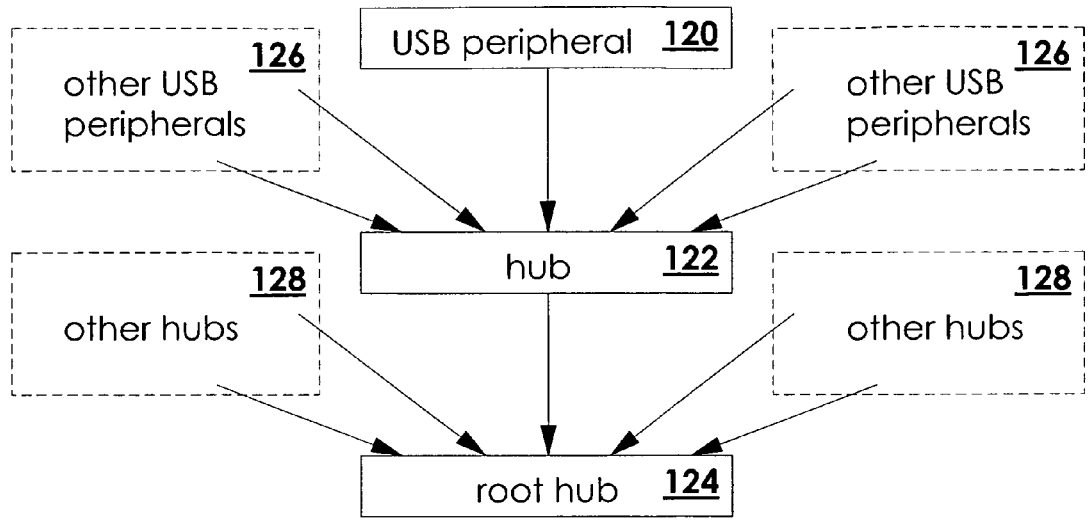
FIGS. 4a and 4b represent a USB driver stack and its relationship to the physical USB network.

The software model for device drivers is a stack based on the tree-like physical configuration of a communication network, such as that shown in FIG. 1. The relationship between the peripheral devices and hubs in the network and software stack appears as shown in FIG. 4a. A particular USB peripheral device 120 is shown connected to a hub 122, to which other peripherals 126 (or hubs) may also be connected. The vertical order of the network components in FIG. 4a is shown inverted with respect to that of FIG. 1. In other words, peripheral device 120 corresponds to the $3^{rd}$ tier of FIG. 1, and represents a USB endpoint. Hub 122 is connected to the root hub 124 (in the host), as are other hubs 128 (and/or peripheral devices). For simplicity, the USB network shown in FIG. 4a has three tiers, but the network could easily be more complex. For example, additional layers, consisting of hubs and peripherals, could appear in place of hub 122.

There are four types of USB data transfers and correspondingly, four types of USB endpoints: control, isochronous, bulk, and interrupt. Endpoints are described by the endpoint descriptor. The fields of this descriptor are shown in Table 9-13 of the USB specification. Excerpts from the USB version 2.0 specification noting the various endpoint descriptor fields are provided in Table 1 as follows:

TABLE 1

Standard Endpoint Descriptor

| Field | Size (in bytes) | Descriptor |
|---|---|---|
| Blength | 1 | Size of this descriptor in bytes |
| BDescriptorType | 1 | ENDPOINT Descriptor Type (5) |
| BEndpointAddress | 1 | The address of the endpoint on the USB device, encoded as follows:<br>Bit 3 . . . 0: The endpoint number<br>Bit 6 . . . 4: Reserved, must be zero<br>Bit 7: Direction, ignored for control endpoints<br>  0 = OUT endpoint<br>  1 = IN endpoint |
| BmAttributes | 1 | This field describes the endpoint's attributes<br>Bits 1 . . . 0: Transfer Type<br>  00 = Control<br>  01 = Isochronous<br>  10 = Bulk<br>  11 = Interrupt<br>For isochronous endpoints, bits 5:2 can be used for specifying synchronization and usage types |
| WMaxPacketSize | 2 | Maximum packet size of the endpoint (bits 10 . . . 0) For high-speed isochronous and interrupt endpoints, bits 12 . . . 11 specify the number of additional transactions allowed per microframe |
| BInterval | 1 | Interval for polling endpoint for data transfers |

The different transfer modes accommodate the various types of peripheral devices supported by USB and have different characteristics that also depend upon device speed. One different characteristic that varies according to device speed and endpoint type is the maximum amount of data that can be transferred in a transaction. This is summarized in Table 2. Another characteristic is direction. Control endpoints are bidirectional: they support transfers from the host to the device (OUT) or from the device to the host. All other endpoints are unidirectional: they may support either OUT or IN transfers (though a device could have two endpoints that are exactly the same except for the direction bit in the endpoint address field).

TABLE 2

Endpoint Maximum Packet Size Constraints (In Bytes)

| Endpoint Type | Low-speed | Full-speed | High-speed |
|---|---|---|---|
| Control | 8 | 8, 16, 32, or 64 | 64 |
| Interrupt | 8 | up to 64 | up to 1024 |
| Isochronous | Not available | up to 1023 | up to 1024 |
| Bulk | Not available | 8, 16, 32, or 64 | 512 |

Control transfers are intended to support configuration, command, and status type communication between the peripheral and the device driver. Control transfers are used, for example, to initialize a USB peripheral device when it is first added to the bus or to query its status. Since control transfers are considered critical, retransmission occurs for corrupted or incomplete packets.

Isochronous transfers are intended to support real-time applications that require transmitting data with a fixed frequency, such as audio and video. The term "isochronous" refers to data arriving at a regular time interval. Isochronous data is typically time-sensitive, but error-tolerant. In other words, it is more important to maintain the data flow rate than to insure complete accuracy of the data packets. Therefore, corrupted or incomplete data packets are not automatically retransmitted.

Bulk endpoints support unidirectional transfers (either IN or OUT) (the same can be said for isochronous transfers), and are intended for transferring large amounts of data with complete accuracy. Bulk transfers may be used, for example, to archive files from the main disk of a computer to a USB-compliant tape drive. Since integrity of the data packets is more important than transfer rate, full error detection and data recovery is provided—corrupted or incomplete packets are automatically retransmitted. Furthermore, because their transfer rate is not critical, bulk transfers are scheduled for intervals when time-critical bus transfers are not in progress, thus optimizing use of the bus bandwidth and providing the best end user experience possible.

Interrupt endpoints support unidirectional transfers (either IN or OUT). They are not interrupts in the usual sense—i.e., the peripheral does not have the capability of preemptively disrupting host activity to initiate a transfer. This would be inconsistent with the characterization of USB as a host-based communication environment. Instead, the host polls the peripheral to determine if it has data for IN endpoints. If so, a packet of data is transferred from the peripheral to the host. For OUT endpoints, the host may periodically send data to the peripheral. Corrupted or incomplete packets are automatically retransmitted.

Figure 4B:
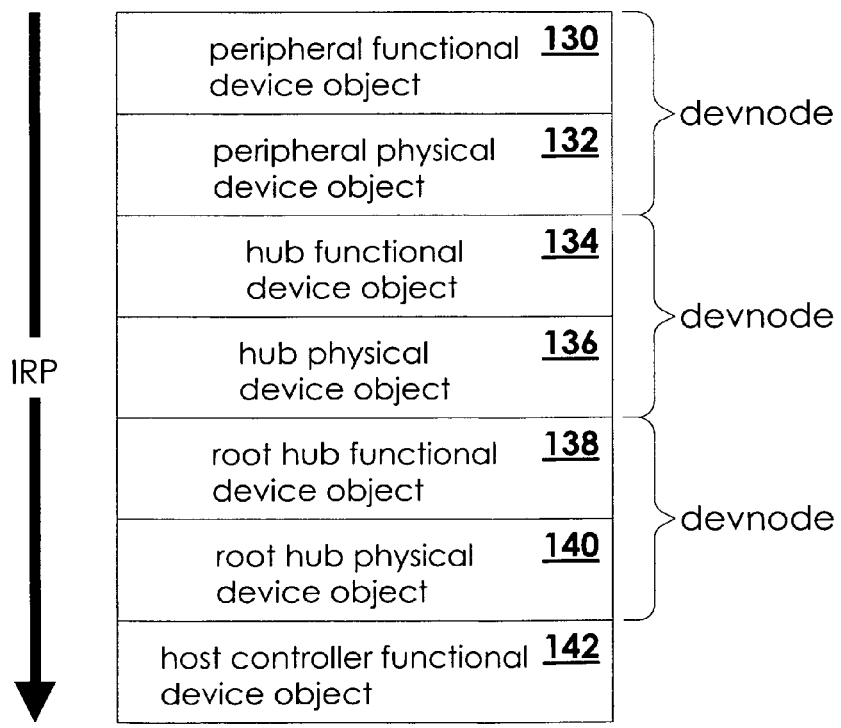

Communication within the operating system is done through a kernel data structure. The kernel data structure is alternatively known as the IRP. A data structure contains fields describing what kind of action is being requested, such as a USB transfer. USB transfers are described by a USB Request Block (URB) structure. IRPs are passed between device nodes ("devnodes") that are layered in a stack manner that reflect how devices are connected in a system, as represented in FIG. 4b. Device nodes minimally consist of two device objects: a physical device object and a functional device object. These device objects are representations of the device to different drivers. A physical device object is the representation of the device to the bus driver. A functional device object is a representation of a device to a functional driver. A bus driver services the bus controller while a functional driver services the device and is the main driver for the device. For a USB functional device object 130 to request a data transfer to an endpoint, it must allocate and initialize an IRP and an URB, and pass down the IRP down the stack. If a device object does not service the IRP, it data structures, which contain the relevant parameters for the I/O request represented by the IRP. There must be an IO_STACK_LOCATION data structure for each of the devnodes through which the IRP will pass. If a given device object, such as an intervening hub, passes the IRP down the stack, it must enter the information for the IO_STACK_LOCATION corresponding to the next lower device object in the stack. When the requested data transfer has been completed, the Windows I/O Manager in the host uses the information in the stack section of the IRP to send the IRP back up the stack (with a "completed" status indication) to the device object that originated the I/O request. The following software code (in the C programming language) defines the IO_STACK_LOCATION data structure.

```
typedef struct _IO_STACK_LOCATION {
    UCHAR MajorFunction;
    UCHAR MinorFunction;
    UCHAR Flags;
    UCHAR Control;
    // The following user parameters are based on the service that is being invoked. Drivers and
    // file systems can determine which set to use based on the above major and minor function
    codes.
    union {
    ...
    } Parameters;
    // Save a pointer to this device driver's device object for this request so it can be passed to the
    // completion routine if needed.
    PDEVICE_OBJECT DeviceObject;
    // The following location contains a pointer to the file object for this
    PFILE_OBJECT FileObject;
    // The following routine is invoked depending on the flags in the above flags field.
    PIO_COMPLETION_ROUTINE CompletionRoutine;
    // The following is used to store the address of the context parameter that should be passed to
    the
    // Completion Routine.
    PVOID Context;
} IO_STACK_LOCATION, *PIO_STACK_LOCATION;
``` simply passes the IRP to the next device object below it. Once the IRP with the USB transfer request reaches the host controller functional device object, the host controller functional device object sees that the IRP is for a USB transfer that it supports. The host controller functional device object schedules the appropriate data transactions (there can be multiple transactions in a transfer), thus instructing the host controller hardware to execute the transactions on the bus. When the data transactions are completed, the host controller functional device object completes the IRP, which sends the IRP back up the stack until it reaches the peripheral functional device object that originated the request.

The USB Request Block is a variable-sized data structure whose parameters depend upon the characteristics of the endpoint for which the transfer is designated. When developing USB drivers, conventional mechanism employ hard-coding of the URB parameters in the driver software stack shown in FIG. 4b. However, this is less than optimal and does not allow an adaptive driver mechanism.

Figure 5:
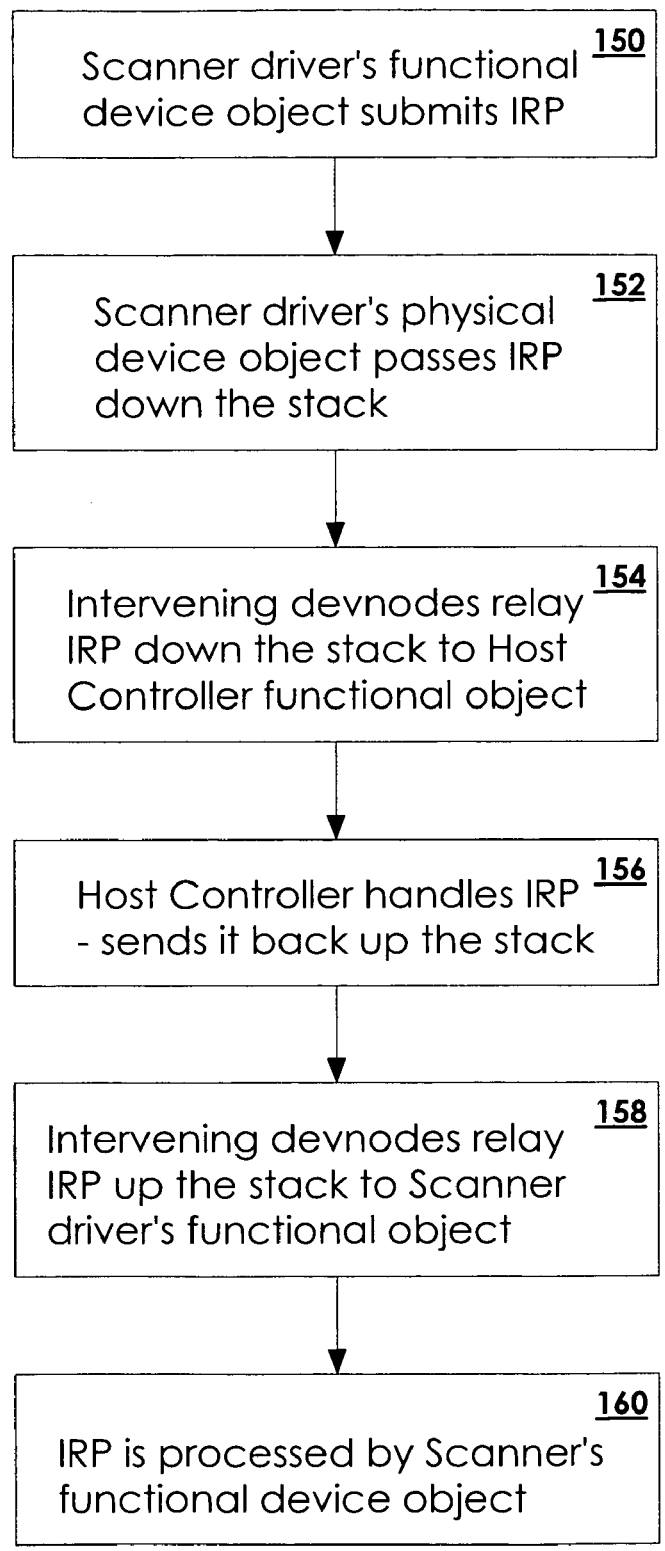
FIG. 5 illustrates the operation of the USB driver stack for a typical data transfer.

As described above, the Windows operating system in the host employs IRPs to communicate with the USB device drivers. The IRP is relayed by the device drivers that correspond to device objects (devnodes) in the physical path through which an IRP must be transferred on its way to the intended peripheral device. In the software model, the devnodes are represented as a stack, and the IRP is passed from one devnode to the next as it traverses the stack. IRPs vary in size, depending on the depth of the stack, and consist of a header portion and a stack portion. Within the stack portion of the IRP is an array of IO_STACK_LOCATION:

USB peripheral devices are automatically detected when they are first installed. When a USB peripheral is plugged into a hub, the hub driver creates a physical device object representing the new peripheral. The Windows operating system then loads the function driver for the device, which creates a functional device object representing the peripheral. The physical/functional device object pair is then added as a new devnode to the USB driver stack. As shown in FIG. 5, the driver stack is involved in all USB data transfers.

In the example shown in FIG. 5, the peripheral device is a USB scanner (i.e., a scanner used to scan alphanumeric characters into a computer). To request a data transfer, the functional device object representing the scanner submits 150 an IRP to the driver stack. The physical device object representing the scanner passes the IRP down the stack 152 to the next lower devnode. By being passed from one intervening devnode to the next 154, the IRP moves all the way down the stack to the host controller. The host controller processes the IRP 156 and sends it back up the driver stack. Reversing the procedure of 152, the devnodes above the host controller pass the IRP back up the stack 158 until it reaches the functional object associated with the scanner. Finally, the IRP is processed by the functional device object 160. At stage 160, the functional device object can examine the completion status of its I/O request.

When the functional device object created by the scanner driver issues an I/O request, as described above, a USB Request Block (URB) is allocated along with the IRP. The URB is a composite data structure, containing information about the I/O request, including a pointer to a designated buffer area for the data being transferred. Because of the different data transfer modes supported by USB (i.e., control, isochronous, bulk and interrupt), the size of the URB and the parameters it contains will generally vary. Advantageously, the present method allows a programmer developing USB driver software to ignore these differences.

After the physical and functional device objects (i.e., devnode) for a USB peripheral have been added to the driver stack, and before the peripheral can send or receive data over the bus, its function driver must be initialized. The PnP capability of USB allows this to be done by the Windows operating system, without user intervention. The operating system accomplishes this by sending a PnP IRP up the driver stack to the newly-added peripheral device. This IRP instructs the peripheral device object to configure itself and register its endpoint(s) with the operating system. In response, the device object creates the following USBD_INTERFACE_INFORMATION data structure.

typically supplied by the peripheral device itself, in response to a PnP query issued by Windows when the peripheral device is first installed. In an embodiment of the method disclosed herein, an adaptive driver makes use of this information to accommodate data transfers from a peripheral device without prior knowledge of the details of the device hardware.

Figure 6:
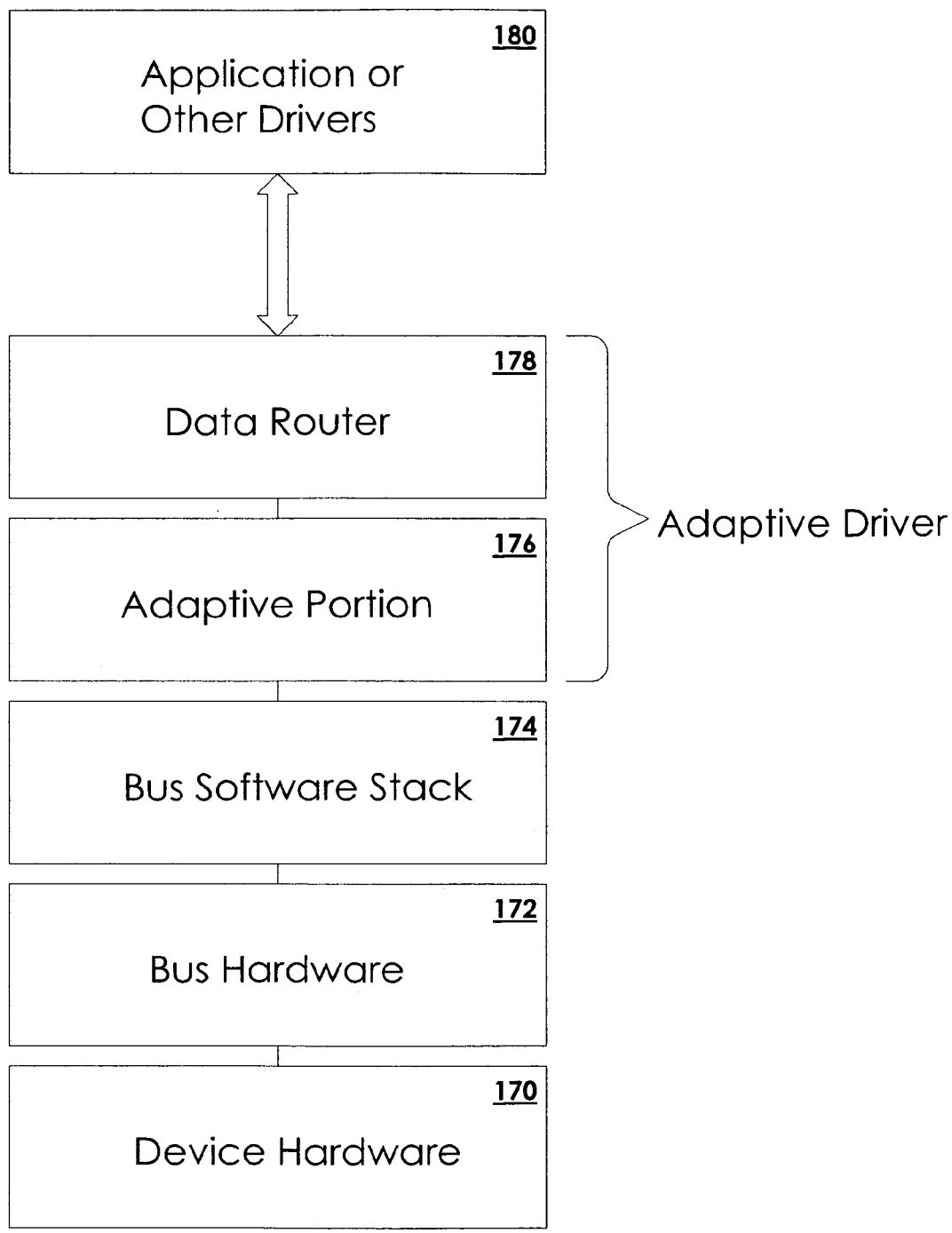
FIG. 6 contains a block diagram model of an adaptive driver.

FIG. 6 presents a conceptual block diagram of the adaptive driver and its relationship to the USB system. At the lowest level of the block diagram is the peripheral device hardware 170, which interfaces directly to the USB bus hardware 172 of the computer system to which it is attached. At the next level is the software stack 174, in which a physical device object/functional device object pair (i.e., a devnode) represents the peripheral device. The USB device drivers correspond to the devnodes in the software stack, and are associated with the next level in the block diagram. This is also the level inhabited by an adaptive driver embodying the present method. The adaptive driver is composed of an

```
typedef struct _USBD_INTERFACE_INFORMATION {
    USHORT Length;    // Length of this structure, including all pipe info. structures that follow.
    // INPUT
    // Interface number and Alternate setting this structure is associated with
    UCHAR InterfaceNumber;
    UCHAR AlternateSetting;
    // OUTPUT
    // These fields are filled in by USBD
    UCHAR Class;
    UCHAR SubClass;
    UCHAR Protocol;
    UCHAR Reserved;
    USBD_INTERFACE_HANDLE InterfaceHandle;
    ULONG NumberOfPipes;
    // INPUT/OUPUT
    // see PIPE_INFORMATION
        USBD_PIPE_INFORMATION Pipes[1];
} USBD_INTERFACE_INFORMATION, *PUSBD_INTERFACE_INFORMATION;
```

A component of the USBD_INTERFACE_INFORMATION data structure is an array of USBD_PIPE_INFORMATION data structures, which contain information central to the operation of the present method of forming the adaptive driver. The following software code defines the USBD_PIPE_INFORMATION data structure.

adaptive portion 176, together with a data router 178. The data router 178 directs data transferred over the USB bus to a predetermined buffer area, an application program or another driver. The software developer must tailor the data router to his particular needs, but this generally does not involve much effort. A user-supplied completion routine must also be supplied. Upon the conclusion of a USB data

```
typedef struct _USBD_PIPE_INFORMATION {
    // OUTPUT - These fields are filled in by USBD
    USHORT MaximumPacketSize;      // Maximum packet size for this pipe
    UCHAR EndpointAddress;    // 8 bit USB endpoint address (includes direction) taken
                              // from endpoint descriptor
    UCHAR Interval;           // Polling interval in ms if interrupt pipe
    USBD_PIPE_TYPE PipeType;      // PipeType identifies type of transfer valid for this pipe
    USBD_PIPE_HANDLE PipeHandle;
    // INPUT - These fields are filled in by the client driver
    ULONG MaximumTransferSize;     // Maximum size for a single request in bytes.
    ULONG PipeFlags;
} USBD_PIPE_INFORMATION, *PUSBD_PIPE_INFORMATION;
```

The fields in this data structure include information about the endpoints of a USBD device, including the USBD_PIPE_HANDLE, which is used to submit input/output transfer requests to the stack. This information is transfer, the completion routine notifies the operating system's input/output manager that the IRP has been completed. The completion routine operates on information supplied by the user in a data structure known as a "context."

The context contains information related to the transfer, such as the original URB request, the number of bytes transferred, completion status, etc.

The adaptive portion 176 of the driver configures itself appropriately according to the characteristics of the peripheral device found in the USBD_PIPE_INFORMATION data structure. The interface between the adaptive portion and the data router consists of:
- a pointer to the functional device object
- the endpoint address to/from which the data will be transferred
- the address of the data buffer
- a pointer to the length of the data buffer
- a setup packet (used only for control transfers)
- a pointer to the completion routine
- a pointer to the context to be passed to the completion routine According to the present method, the steps needed to make a driver adaptive include, locating the pointer to the USBD_PIPE_INFORMATION data structure corresponding to the endpoint address associated with the newly-added USB peripheral device. Next, the URB is allocated, based on the endpoint type and possibly the buffer length. Then the URB is initialized, based on the endpoint type and possibly the buffer length.

The pointer to the USBD_PIPE_INFORMATION data structure is found by comparing the endpoint address assigned to the peripheral device to addresses appearing in the endpoint address field of data structures found in the array of USBD_PIPE_INFORMATION structures. The following software code performs this operation:

```
FindEpWithAddress(
            IN PDEVICE_EXTENSION DeviceExtension, IN UCHAR EndpointAddress)
{
PUSB_CONFIGURATION_DESCRIPTOR
currCfg = DeviceExtension->ConfigurationDescriptors[DeviceExtension->ulCurrentConfigurationIndex];
        ULONG ifcIndex = 0;
        ULONG epIndex = 0;
        KdPrint(("FindEpWithAddress: 0x%x\n", EndpointAddress));
        for (ifcIndex = 0; ifcIndex < currCfg->bNumInterfaces; ifcIndex++)
        {
            for (epIndex = 0; epIndex < DeviceExtension->InterfaceList[ifcIndex]->NumberOfPipes; epIndex++)
            {
                PUSBD_PIPE_INFORMATION pipe = &DeviceExtension->InterfaceList[ifcIndex]->Pipes[epIndex];
                if (pipe->EndpointAddress == EndpointAddress)
                {
                    KdPrint(("FOUND ENDPOINT: 0x%x Pipe address 0x%x\n", pipe->EndpointAddress, pipe));
                    return pipe;
                }
                else
                {
                    KdPrint(("Mismatch with endpoint: 0x%x\n", pipe->EndpointAddress));
                }
            }
        }
        KdPrint("DID NOT FIND EP WITH ADDRESS: 0x%x\n, EndpointAddress));
        return NULL;
}
```

The following software code allocates an URB:

```
PURB
AllocateUrbForPipe(IN PUSBD_PIPE_INFORMATION Pipe, IN ULONG BufferLength)
{
    ULONG ulUrbSize; // used to store the urb size;
    PURB urb = NULL;
    if (Pipe == NULL)
        goto AllocateUrbForPipeDone;
    switch(Pipe->PipeType)
    {
    case UsbdPipeTypeControl:
        ulUrbSize = sizeof(struct_URB_CONTROL_TRANSFER);
        break;
    case UsbdPipeTypeIsochronous:
        {
            ULONG length = Pipe->MaximumTransferSize < BufferLength ? Pipe->MaximumTransferSize : BufferLength;
            ULONG numPackets = length /Pipe->MaximumPacketSize;
            // if there is a remainder, increment the number of packets to be sent
```

```
            if (length % Pipe->MaximumPacketSize != 0)
                numPackets++;
            ulUrbSize = GET_ISO_URB_SIZE(numPackets);
        }
        break;
    case UsbdPipeTypeBulk:
    case UsbdPipeTypeInterrupt:
        ulUrbSize = sizeof(struct_URB_BULK_OR_INTERRUPT_TRANSFER);
        break;
    default:
        ulUrbSize = 0;
    }
    if (ulUrbSize == 0)
        goto AllocateUrbForPipeDone;
    urb = ExAllocatePool(NonPagedPool, ulUrbSize);
    if (!urb)
        goto AllocateUrbForPipeDone;
    RtlZeroMemory(urb, ulUrbSize);
AllocateUrbForPipeDone:
    return urb;
}
```

The third step of initialization of an URB requires examining the Pipe Type and possibly buffer length to determine the amount of memory to be allocated for the URB. The following software code initializes the URB:

```
NTSTATUS
InitializeUrb(
    IN PDEVICE_OBJECT         DeviceObject,
    IN PURB                   Urb,
    IN PUSBD_PIPE_INFORMATION Pipe,
    IN PVOID                  Buffer,
    IN ULONG                  BufferLength,
    IN PSETUP_PACKET          SetupPacket
    )
{
    NTSTATUS ntStatus = STATUS_SUCCESS;
    ULONG i = 0;
    ULONG transferFlags;
    ULONG numPackets;
    // *************************************
    // Check for valid parameters
    // *************************************
    if (Urb == NULL)
    {
        ntStatus = STATUS_INVALID_PARAMETER;
        goto InitializeUrbDone;
    }
    if (Pipe == NULL)
    {
    ntStatus = STATUS_INVALID_PARAMETER;
    goto InitializeUrbDone;
    }
    // If we have a control transfer, we must have a setup packet
    if (Pipe->PipeType == UsbdPipeTypeControl && SetupPacket == NULL)
    {
        ntStatus = STATUS_INVALID_PARAMETER;
        goto InitializeUrbDone;
    }
    // Check the buffer length as we cannot transmit greater than the maximum transfer size
    // Set the buffer length to the max transfer size as feedback maximum transfer size
    if (BufferLength > Pipe->MaximumTransferSize)
    {
        ntStatus = STATUS_INVALID_PARAMETER;
        goto InitializeUrbDone;
    }
    numPackets = BufferLength /Pipe->MaximumPacketSize;
    // if there is a remainder, increment the number of packets to be sent
    if (BufferLength % Pipe->MaximumPacketSize != 0)
        numPackets++;
    // Set the transfer flag(s)
    if (Pipe->PipeType == UsbdPipeTypeControl)
```

-continued

```
    {
        transferFlags = SetupPacket->bmReqType.Direction == DIR_HOST_TO_DEVICE ?
            USBD_TRANSFER_DIRECTION_OUT : USBD_TRANSFER_DIRECTION IN |
USBD_SHORT_TRANSFER_OK;
    }
    else
    {
        transferFlags = USB_ENDPOINT_DIRECTION_OUT(Pipe->EndpointAddress) ? \
            USBD_TRANSFER_DIRECTION_OUT : USBD_TRANSFER_DIRECTION IN |
USBD_SHORT_TRANSFER_OK;
    }
    // Set up the urb parameters here -
    switch(Pipe->PipeType)
    {
    case UsbdPipeTypeControl:
        Urb->UrbHeader.Function = URB_FUNCTION_CONTROL_TRANSFER;
        Urb->UrbHeader.Length = sizeof(struct _URB_CONTROL_TRANSFER);
        Urb->UrbControlTransfer.PipeHandle = Pipe->PipeHandle;
        Urb->UrbControlTransfer.TransferFlags = transferFlags;
        Urb->UrbControlTransfer.TransferBufferLength = BufferLength;
        Urb->UrbControlTransfer.TransferBuffer   = Buffer;
        Urb->UrbControlTransfer.TransferBufferMDL = NULL;
        Urb->UrbControlTransfer.UrbLink = NULL;
        RtlCopyMemory(&Urb->UrbControlTransfer.SetupPacket[0], PVOID)SetupPacket, 8);
        break;
    case UsbdPipeTypeBulk:
    case UsbdPipeTypeInterrupt:
        UsbBuildInterruptOrBulkTransferRequest(Urb,
                                    sizeof(struct _URB_BULK_OR_INTERRUPT_TRANSFER),
                                    Pipe->PipeHandle,
                                    Buffer,
                                    NULL, // No MDL
                                    BufferLength,
                                    transferFlags,
                                    NULL);
        break;
    case UsbdPipeTypeIsochronous:
        Urb->UrbIsochronousTransfer.Hdr.Length = GET_ISO_URB_SIZE(numPackets);
        Urb->UrbIsochronousTransfer.Hdr.Function = URB_FUNCTION_ISOCH_TRANSFER;
        Urb->UrbIsochronousTransfer.PipeHandle = Pipe->PipeHandle;
        Urb->UrbIsochronousTransfer.TransferFlags = transferFlags |
USBD_START_ISO_TRANSFER_ASAP;
        Urb->UrbIsochronousTransfer.TransferBufferLength = BufferLength;
        Urb->UrbIsochronousTransfer.TransferBuffer = Buffer;
        Urb->UrbIsochronousTransfer.TransferBufferMDL = NULL;
        Urb->UrbIsochronousTransfer.UrbLink = NULL;
        Urb->UrbIsochronousTransfer.StartFrame = 0;
        Urb->UrbIsochronousTransfer.NumberOfPackets = numPackets;
        Urb->UrbIsochronousTransfer.ErrorCount = 0;
        for (i = 0; i < numPackets; i++)
        {
            Urb->UrbIsochronousTransfer.IsoPacket[i].Offset = i*Pipe->MaximumPacketSize;
        }
        break;
    }
InitializeUrbDone:
    return ntStatus;
}
```

The software code contained in the preceding listings embodies the adaptive portion of the USB driver, corresponding to item 176 in FIG. 6. It enables the creation of a generic, device-independent driver by obtaining the necessary characteristics of the peripheral hardware during runtime by using information supplied by the device itself in the USBD_PIPE_INFORMATION data structure. However, a fully functional driver requires a data router 178 to deliver data transferred over the USB bus to/from the peripheral device. Data routing is performed within the user supplied completion routine. In contrast to the adaptive portion of the driver, data routing cannot be generic since it depends on the particular application. To properly deliver the transferred data, the completion routine requires related information, such as the transfer completion status, location of the data buffer, amount of data, etc. This information is contained in the context, which is passed as a parameter to the completion routine. The recipient of the transferred data is typically an application that made the original I/O call to the adaptive driver. In order to receive the transferred data, the caller has its own context and completion routine. The address of the caller's completion routine is provided in the adaptive context.

The complete sequence needed for a single USB transfer by an adaptive driver can be summarized as follows (including the previous three-step sequence):

(1) Locate the USBD_PIPE_INFORMATION data structure corresponding to the endpoint address associated with the newly-added USB peripheral device.

(2) Allocate memory for an URB.

(3) Initialize the URB, using the data in USBD_PIPE_INFORMATION.

(4) Create an IRP, in which to submit the URB to the USB stack.

(5) Attach the user-supplied adaptive completion routine to the IRP.

(6) Allocate and initialize an adaptive context to be passed to the adaptive completion routine.

(7) Attach the adaptive context to the IRP to be passed to the adaptive completion routine.

(8) Submit the IRP to the stack.

(9) When the IRP completes, from the adaptive completion routine, call the passed-in/caller's completion routine with the passed-in/caller's context.

The following software code interfaces the adaptive portion of the driver to the data router:

```
NTSTATUS
SubmitAdaptiveTransfer(
    IN PDEVICE_OBJECT DeviceObject,
    IN UCHAR EndpointAddress,
    IN PVOID Buffer,
    IN OUT PULONG BufferLength,
    IN PSETUP_PACKET SetupPacket,
    IN PIO_COMPLETION_ROUTINE CompletionRoutine,
    IN PVOID Context
    )
{
    PDEVICE_EXTENSION       deviceExtension = DeviceObject->DeviceExtension;
    NTSTATUS                ntStatus = STATUS_SUCCESS;
    PUSBD_PIPE_INFORMATION  pipe =NULL;
    PURB                    urb = NULL;
    PADAPTIVE_CONTEXT       context;
    pipe = FindEpWithAddress(deviceExtension, EndpointAddress);
    if (!pipe)
    {
        ntStatus = STATUS_INVALID_PARAMETER;
        goto SubmitAdaptiveTransferDone;
    }
    urb = AllocateUrbForPipe(pipe, *BufferLength);
    if (!urb)
    }
        ntStatus = STATUS_NO_MEMORY;
        goto SubmitAdaptiveTransferDone;
    }
    ntStatus = InitializeUrb(DeviceObject, urb, pipe, Buffer, *BufferLength, SetupPacket);
    if (!NT_SUCCESS(ntStatus))
    {
        goto SubmitAdaptiveTransferDone;
    }
    if (pipe->PipeType == UsbdPipeTypeIsochronous)
    {
        KdPrint(("Resetting iso pipe 0x%02x\n", pipe->EndpointAddress));
        ResetPipe(DeviceObject, pipe);
    }
    context = AllocateAdaptiveContext(DeviceObject);
    if (!context)
    {
        ntStatus = STATUS_NO_MEMORY;
        goto SubmitAdaptiveTransferDone;
    }
    context->DeviceObject               = DeviceObject;
    context->SubmittedCompletionRoutine = CompletionRoutine;
    context->SubmittedContext           = Context;
    context->Buffer                     = Buffer;
    context->BufferLength               = *BufferLength;
    context->Urb                        = urb;
    ntStatus = SubmitAdaptiveUrb(DeviceObject, urb, context);
SubmitAdaptiveTransferDone:
    return ntStatus;
}
```

The following software code is used to submit the completed URB to the USB Stack:

```
NTSTATUS
SubmitAdaptiveUrb(
    IN PDEVICE_OBJECT Device Object,
    IN PURB Urb,
    IN PVOID Context
    )
{
    PDEVICE_EXTENSION deviceExtension = DeviceObject->DeviceExtension;
    PIO_STACK_LOCATION nextStack;
    NTSTATUS ntStatus = STATUS_SUCCESS;
    NTSTATUS status = STATUS_SUCCESS;
    PIRP        irp = IoAllocateIrp((CCHAR)(deviceExtension->StackDeviceObject->StackSize + 1), FALSE);
    if (!irp)
    {
        ntStatus = STATUS_INSUFFICIENT_RESOURCES;
        goto SubmitAdaptiveUrbDone;
    }
    nextStack = IoGetNextIrpStackLocation(irp);
    if (nextStack == NULL)
    {
        ntStatus = STATUS_UNSUCCESSFUL;
        goto SubmitAdaptiveUrbDone;
    }
    nextStack->Parameters.Others.Argument1 = Urb;
    nextStack->Parameters.DeviceIoControl.IoControlCode = IOCTL_INTERNAL_USB_SUBMIT_URB;
    nextStack->MajorFunction = IRP_MJ_INTERNAL_DEVICE_CONTROL;
    IoSetCompletionRoutine(irp,
            AdaptiveCompletionRoutine,
            Context,
            TRUE, // Invoke on Success
            TRUE, // Invoke on Error
            TRUE); // Invoke on Cancel
    ntStatus = IoCallDriver(deviceExtension->StackDeviceObject, irp);
    if (ntStatus == STATUS_PENDING)
    {
        IoMarkIrpPending(irp);
    }
    else
    {
        IoFreeIrp(irp);
    }
SubmitAdaptiveUrbDone:
    return ntStatus;
}
```

Figure 7:
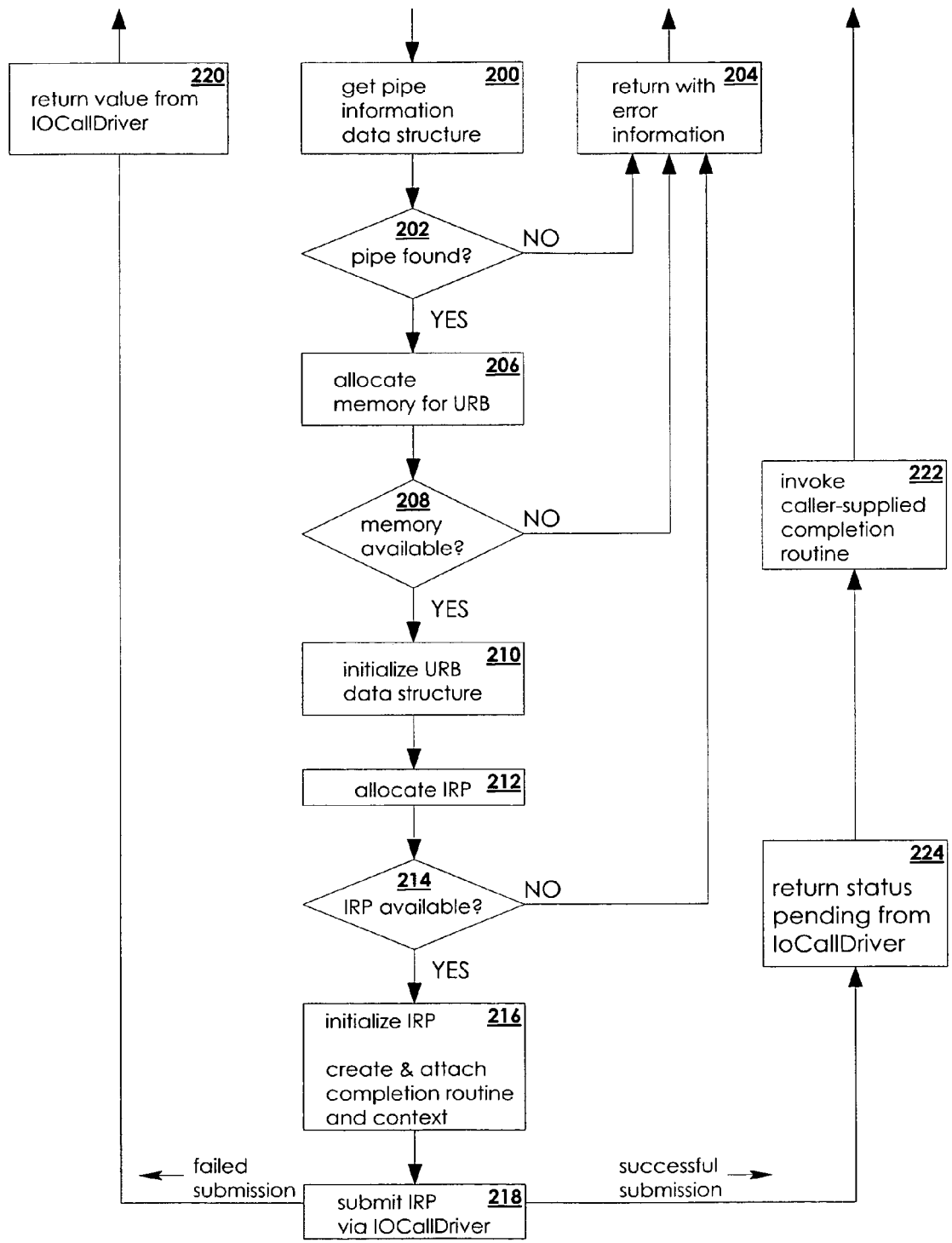
FIG. 7 contains a flowchart representing the use of the present method for a single USB transfer.

The earlier nine-step sequence for a single USB transfer by an adaptive driver is represented as a flowchart in FIG. 7. The first step of the sequence is implemented by getting the USBD_PIPE_INFORMATION data structure 200. If this structure cannot be located 202, an error is returned 204. The second step of the sequence requires allocating memory for the URB 206. If memory for the URB is not available 208, an error is returned 204. In step three, the URB is initialized 210. This involves setting up URB parameters for the type of transfer, the number of data packets to be transferred, etc. Step four of the sequence for a single USB transfer is implemented in blocks 212 and 214 of the flowchart. The driver attempts to allocate an IRP 212. If this fails 214, an error is returned 204. Once allocated, the IRP is initialized 216 and the adaptive completion routine and context are attached, fulfilling steps five, six and seven of the sequence. Initialization of the IRP involves designating the URB address for the data transfer and building the variable-size array of IO_STACK_LOCATION data structures in the stack section of the IRP. Following initialization, the IRP is submitted to the stack by the Windows operating system's IOCallDriver routine 218. If the submission is successfully requested, a "status pending" message is returned 224 by the IOCallDriver, following which, the user-supplied completion routine is invoked 222 to report completion results to the functional device object that originated the USB transfer. Otherwise, IOCallDriver returns an error code 220, which may be forwarded to the application program utilizing the device driver.

For streaming USB transfers, the nine-step procedure described above and represented in the flowchart in FIG. 7 must be separated into an allocation phase and a submission phase. The allocation phase occurs once, while the submission phase is repeated as necessary to transfer the entire data stream. The interface for the allocation phase consists of the following parameters:
   a pointer to the functional device object
   the endpoint address to/from where the data will be transferred
   a data buffer to hold the transferred data
   a pointer to the location of the data buffer
   a setup packet (used for control transfers only)
   a pointer to the location of an IRP The interface for the submission phase consists of the following parameters:
   a pointer to the functional device object
   a pointer to an IRP a pointer to the caller's completion routine a pointer to the caller's context to be passed to the caller's completion routine FIG. 8 contains a flowchart representing the submission phase of the procedure for streaming data transfers, using an adaptive driver. Note that much of this procedure is the same as that for a single transfer, since the allocation and initialization of an IRP and URB for a single transfer will be the same for streaming transfers. As before, the adaptive portion of the driver begins by finding the USBD_PIPE_INFORMATION data structure 300. If this data structure cannot be found 302 an error is returned 304. Otherwise, memory is allocated 306 for an URB. If memory cannot be allocated for the URB 308, an error is reported 304. Once memory has been reserved, the URB is initialized 310, and an IRP is allocated 312. If the IRP allocation fails 314, an error is reported 304. If the IRP memory allocation is successful, the IRP is initialized 316 and the adaptive completion routine and context are attached. A "status pending" message is returned 320 by the IoCallDriver, after which, the caller-supplied completion routine is invoked 318 to notify the driver originating the I/O request. Once the IRP and URB have been properly initialized, they are used repeatedly for each packet of the streaming transfer, as represented in FIG. 9.

Figure 8:
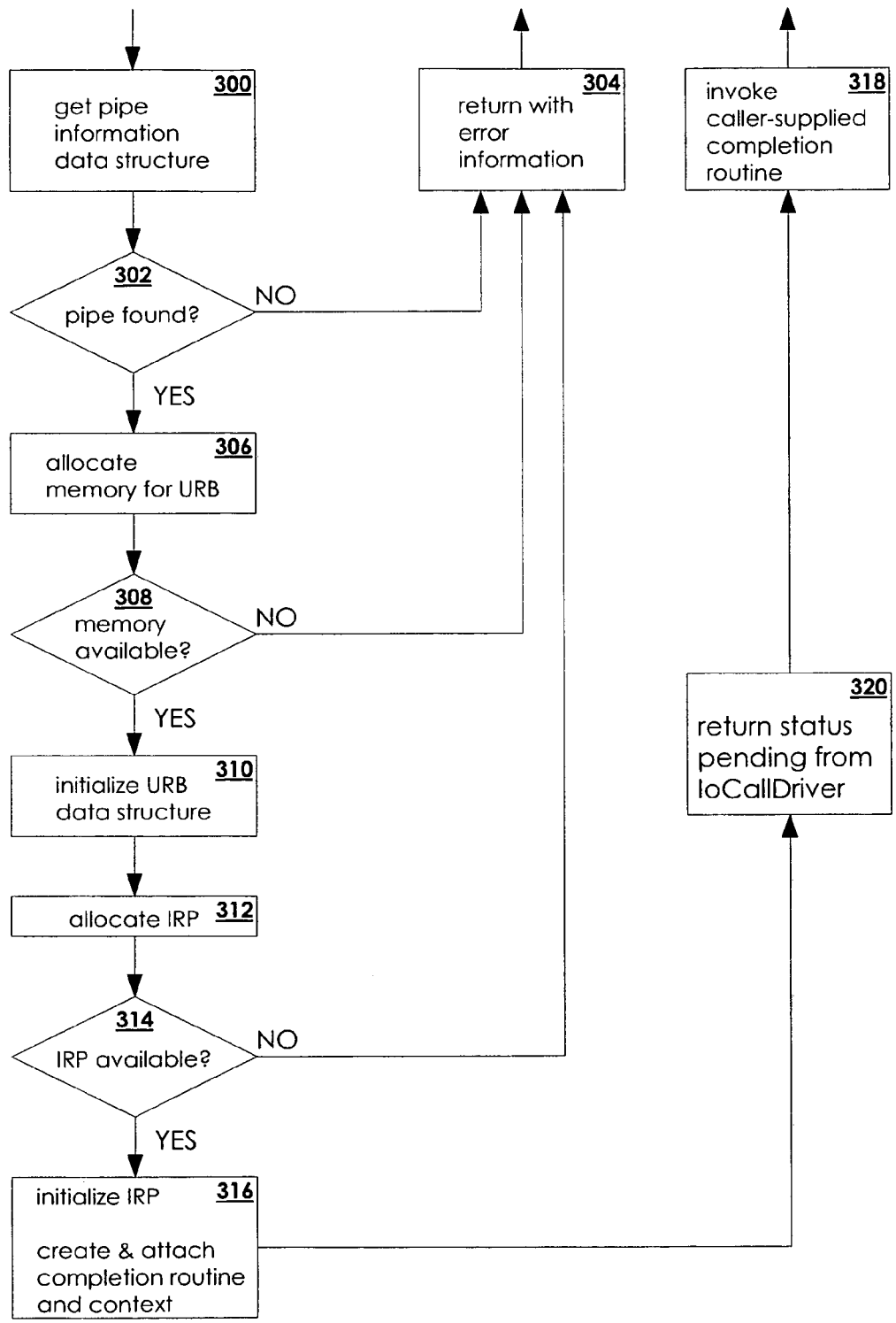
FIG. 8 contains a flowchart representing the allocation phase of a streaming USB transfer.
Figure 9:
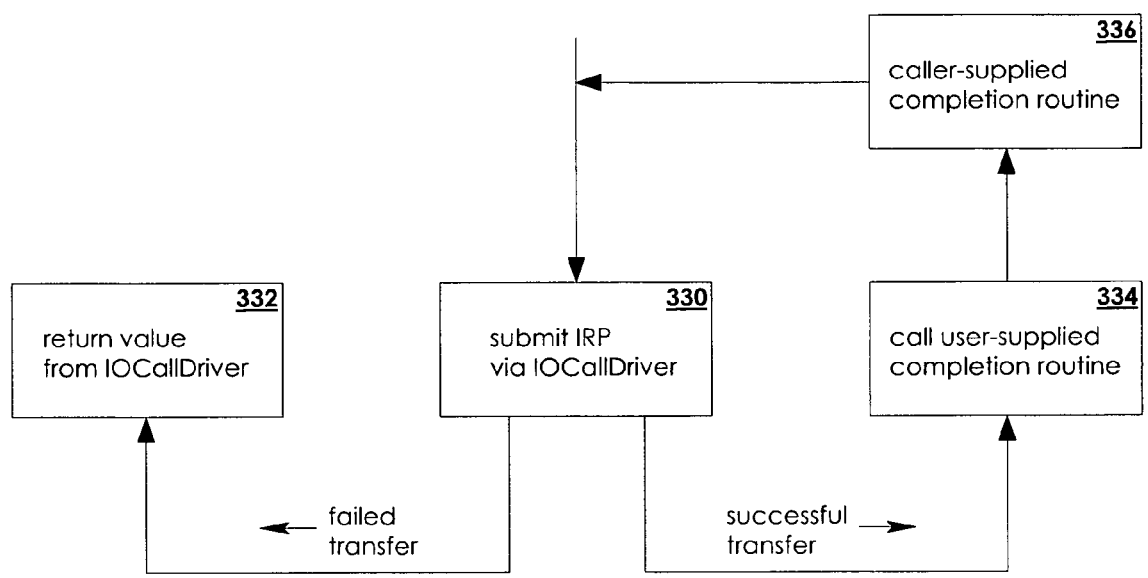
FIG. 9 contains a flowchart representing the submission phase of a streaming USB transfer.

The sequence of events in FIG. 9 begins when the IRP (which was created at the conclusion of the allocation procedure in FIG. 8) is submitted to the USB stack 330, via the operating system's IOCallDriver routine. The IRP is resubmitted for each packet in the data stream that must be transferred. If any of these transfers fails, IOCallDriver returns an error code 332—depending on the type of transfer, the transfer may then be retried. Each time the transfer is completed successfully, the user-supplied completion routine (a pointer to which is supplied to the IRP) is called 334. The completion routine notifies the functional device object originating the I/O request of the successful completion and re-enters the submission phase 330 to transfer the next packet in the data stream.

Figure 10:
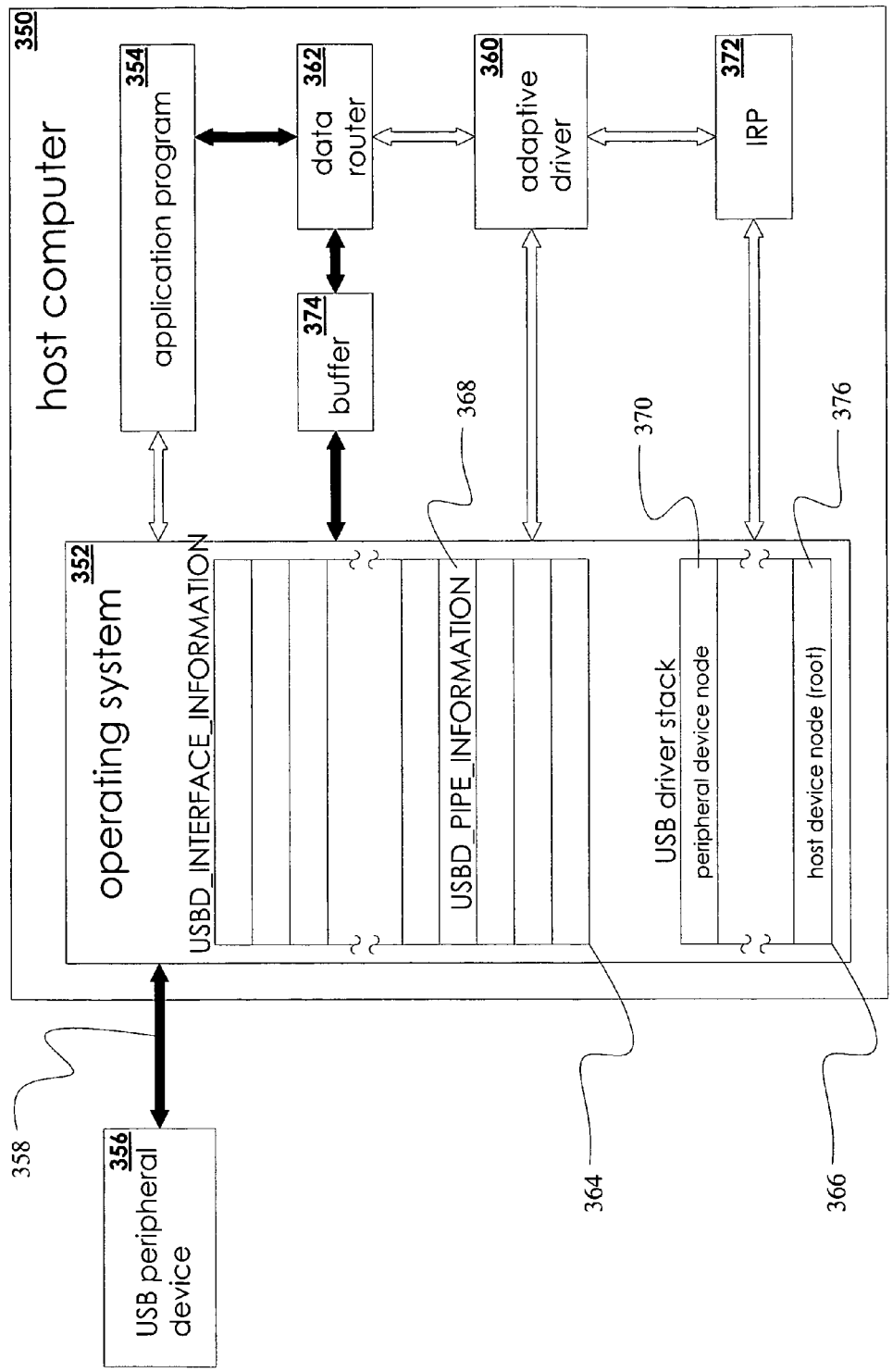
FIG. 10 represents a computer system employing an operating system and the formation of an adaptive driver from the operating system and compilation of a resulting driver stack.

FIG. 10 represents an embodiment of a computer system employing the adaptive driver method disclosed herein. The host computer 350 contains an operating system 352, within which an application program 354 is running. A peripheral device 356 (e.g., a USB peripheral device) is coupled to the host computer 350 by a serial bus 358 (e.g., USB). In this example, it is assumed that the USB peripheral device 356 transmits data to the application program 354 (e.g., a USB scanner sending image data to a desktop publishing application), and the dark arrows represent the data transfer path. In FIG. 10, the USB peripheral device 356 communicates with the application program 354 via adaptive driver 360, using the USBD_INTERFACE_INFORMATION 364 and USB driver stack 366 data structures maintained by the operating system. When the USB peripheral device 356 is first connected to the USB bus 358, the operating system detects its presence and queries it to obtain its input/output characteristics. This information is then used by the operating system 352 to create an entry 368 corresponding to USB peripheral 356 in the USBD_INTERFACE_INFORMATION array 364. The operating system also adds a device node 370 representing the peripheral to the USB driver stack 366.

Adaptive driver 360 accesses the USBD_PIPE_INFORMATION 368 for the peripheral device 356 to obtain its input/output characteristics. The adaptive driver uses this data to construct an IRP 372, and to request from the operating system allocation of a buffer 374 of appropriate size to receive the data from the peripheral device 356. To transfer data from the peripheral device 356 over USB bus 358, the adaptive driver submits an IRP 372 to be passed down the USB driver stack 366 to the host device node at the bottom of the stack. In response, the operating system 352 schedules the data transfer from the peripheral device 356 into buffer 374, according to the requirements of any other USB peripheral devices that may share the bus 358. When the data transfer has been carried out, the completed IRP 372 is passed back up the USB driver stack 366 to the peripheral device node 370. The adaptive driver 360 receives the completed IRP 372, and calls a data router 362 to deliver the data from the buffer 374 to the application program 354.

It is believed that the method disclosed herein will permit the development of a driver for a USB peripheral device without incorporating hardware specific instruction code. For example, parameters such as the USB transfer mode, or the size of the data buffer are generally dependent on characteristics of the particular USB peripheral. Previously, these parameters had to be ascertained by the programmer before the driver could be written. Based on these parameters, instructions that generate the data structures (i.e., IRP and URB) necessary for USB data transfers then had to be "hard-coded" into the driver to support the intended peripheral device. In contrast, the adaptive driver of the present method extracts these parameters from the USBD_PIPE_INFORMATION data structure, which is created from information supplied by each Plug-and-Play USB device when it is first installed. The adaptive driver then automatically creates and configures the IRP and URB accordingly. This is clearly advantageous in terms of development time and effort, as well as reliability of the driver. Data routing is the only function of the driver requiring customization. The delivery of transferred data to the intended recipient (typically an application program) is application-dependent, and cannot readily be automated. However, it is a minor part of the driver development task.

It will be appreciated by those skilled in the art having the benefit of this disclosure that the embodiments described are believed applicable to the development of adaptive device drivers for USB peripherals, or for other types of serial bus that support multiple transfer modes, such as IEEE1394 (Firewire), or Bluetooth. Details described herein, such as the specific instruction sequence used to locate and retrieve data from the USBD_PIPE_INFORMATION data structure, are exemplary of a particular embodiment. Furthermore, although the embodiments used to exemplify the method are based on the Windows operating system and the USB bus, the method is believed to also be applicable to other operating systems and buses. It is therefore intended that the following claims be interpreted to embrace all such modifications and changes and, accordingly, the specification and drawings are to be regarded in an illustrative rather than a restrictive sense.

What is claimed is:

1. A method for forming an adaptive software driver for a peripheral device interfaced to a computer equipped with an operating system, the method comprising:

locating a data structure within the operating system that defines an operating parameter of the peripheral device;

using the operating parameter to create a request packet of data corresponding to the peripheral device;

submitting the request packet of data to a first one of a plurality of linked data fields, each one of which represents a hardware device coupled between the operating system and the peripheral device representative of a routing path between the operating system and the peripheral device;

routing by using pointers corresponding to each of the hardware devices between the operating system and the peripheral device; and receiving the request packet of data from a last one of the plurality of linked data fields to complete a transfer of data to or from the peripheral device necessary to form the adaptive driver, by saving the pointers.

2. The method as recited in claim 1, wherein said locating comprises drawing the data structure from a Windows® based operating system.

3. The method as recited in claim 2, wherein said locating comprises finding the data structure transmitted to the operating system from the peripheral device when the peripheral device is connected to the serial bus interfaced to the computer.

4. The method as recited in claim 1, wherein said routing path comprises a serial bus.

5. The method as recited in claim 1, wherein said plurality of linked data fields comprise a driver stack maintained within the operating system.

6. The method as recited in claim 1, wherein the first one of the plurality of linked data fields comprises a functional representation of the peripheral device which, when linked with the remaining data fields, represents the entirety of the routing path between the peripheral device and the computer stored as the adaptive driver within the operating system of the computer.

7. The method as recited in claim 1, wherein the last one of the plurality of linked data fields comprises a functional representation of the operating system which, when linked with the remaining data fields, represents a calling routine that signals a completion of the adaptive driver.

8. A computer executable program for forming a driver for a peripheral device, comprising:

a first instruction for extracting data indicative of the peripheral device coupled to a computer upon which the executable program is executable;

a second instruction for using the extracted data to trigger a pointer directed to a first one of a plurality of linked data fields, each one of the data fields represents a hardware device coupled between the peripheral device and the computer;

a third instruction for using a set of pointers, including said pointer, and corresponding to each of the hardware devices between the operating system and the peripheral device; and a fourth instruction for storing the set of pointers which form the adaptive software driver in memory representative of the linked data fields interposed between the first data field and a last data field when the pointer reaches the last data field.

9. The program as recited in claim 8, wherein the computer executable program comprises a Windows® based operating system.

10. The program as recited in claim 8, wherein said peripheral device is coupled to the computer via a serial bus.

11. The program as recited in claim 8, wherein said first instruction fetches a data structure forwarded to and maintained within an operating system of the computer when the peripheral device is coupled to the computer, wherein the data structure represents the input or output characteristics of the peripheral device.

12. The program as recited in claim 8, wherein the linked data fields comprise a driver stack maintained within an operating system of the computer.

13. The program as recited in claim 8, wherein the first one of the plurality of linked data fields comprises a functional representation of the peripheral device which, when linked with the remaining data fields, represents the entirety of the routing path between the peripheral device and the computer stored as the adaptive driver within the operating system of the computer.

14. The program as recited in claim 13, wherein the entirety of the routing path between the peripheral device and the computer comprises source and destination addresses of each said hardware device along the routing path.

15. The program as recited in claim 8, wherein the last one of the plurality of linked data fields comprises a functional representation of an operating system of the computer which, when linked with the remaining data fields, represents a calling routine that signals a completion of the adaptive driver.

16. The program as recited in claim 8, wherein the extracted data comprises a USBD_PIPE_INFORMATION data structure created and forwarded to an operating system of the computer when the peripheral device is coupled to the computer.

17. The program as recited in claim 8, wherein the second instruction initiates a request packet of data being submitted to the first one of the plurality of linked data fields.

18. The program as recited in claim 17, wherein the request packet of data comprises an input/output request packet (IRP).

19. The program as recited in claim 18, wherein the fourth instruction initiates a universal serial bus (USB) data structure and couples the USB to the IRP resident in an operating system of the computer.

20. A computer system, comprising:

a computer executable from an operating system;

peripheral device connected to the computer via a serial bus;

program maintained within the operating system for forming a driver for the peripheral device by (i) fetching data sent to the operating system from the peripheral device representing operating characteristics of the peripheral device, (ii) using the fetched data to signal a pointer to point to a first one of a plurality of linked data fields representing operating characteristics of hardware devices coupled between the computer and the peripheral device, (iii) routing between the linked data fields by using a set of pointers corresponding to each of the hardware devices coupled between the operating system and the peripheral device; and (iv) storing the set of pointers gathered from the linked data fields which from the driver commands when the pointer reaches a last one of the plurality of linked data fields.

21. The computer system as recited in claim 20, wherein the stored driver commands comprise the operating characteristics of the operating system, the peripheral device and all intervening hardware devices to represent the entirety of all communication protocols needed by the operating system to operate the peripheral device.

* * * * *